United States Patent
Vanderpool

(10) Patent No.: US 11,358,447 B2
(45) Date of Patent: Jun. 14, 2022

(54) TOLERANCE COMPENSATING HINGE ATTACHMENT

(71) Applicant: Magna Exteriors Inc., Concord (CA)

(72) Inventor: Vaughn D. Vanderpool, Perrysburg, OH (US)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 16/561,080

(22) Filed: Sep. 5, 2019

(65) Prior Publication Data
US 2020/0070632 A1  Mar. 5, 2020

Related U.S. Application Data

(60) Provisional application No. 62/727,171, filed on Sep. 5, 2018.

(51) Int. Cl.
*B60J 5/10* (2006.01)
*B23P 19/06* (2006.01)

(52) U.S. Cl.
CPC .............. *B60J 5/107* (2013.01); *B23P 19/06* (2013.01); *B60J 5/102* (2013.01); *B23P 2700/50* (2013.01)

(58) Field of Classification Search
CPC . B60J 5/107; B60J 5/102; B62D 65/024; B62D 65/06; E05D 11/0009; E05D 7/0423; E05D 5/0207; E05D 5/00; E05D 7/04; E05Y 2600/56; E05Y 2900/546; E05Y 2900/532
See application file for complete search history.

(56) References Cited

U.S. PATENT DOCUMENTS

| | | | | |
|---|---|---|---|---|
| 5,038,436 A * | 8/1991 | Ihrke | ....................... | E05D 7/121 16/249 |
| 5,398,379 A * | 3/1995 | Kiefer | ..................... | E05D 3/022 16/364 |
| 6,836,933 B2 * | 1/2005 | Janczak | ................ | E05D 5/0207 16/221 |
| 7,114,219 B2 * | 10/2006 | Kiefer | ..................... | E05D 5/062 16/366 |
| 7,197,797 B2 * | 4/2007 | Janczak | ................ | E05D 5/0207 29/11 |

* cited by examiner

*Primary Examiner* — Rick K Chang
(74) *Attorney, Agent, or Firm* — Warn Partners, P.C.

(57) ABSTRACT

A lift gate door having hinges installed for predetermined positioning into a vehicle. And a method of attaching a lift gate door to a vehicle while maintain proper tolerances. A first fixture holds a set of hinges in predetermined locations which correspond to assembly locations on a vehicle body. Hinges are temporarily attached to the fixture corresponding to the proper vehicle location. A second fixture holds the lift gate in a position which is a final installation position for attaching the lift gate to a vehicle. Self-adjusting moveable fastening nuts are provided in a set of holes in a hinge plate fastening area of the lift gate. The first fixture is moved into aligned orientation with the second feature and the hinges are attached to the lift gate with the fastener. The hinge is aligned in the proper installation orientation for maintaining the lift gate to vehicle gap in proper tolerances when the lift gate door with hinges is installed on the final vehicle.

9 Claims, 5 Drawing Sheets

TOLERANCE COMPENSATING HINGE ATTACHMENT

CROSS-REFERENCE TO RELATED APPLICATIONS

This application claims priority to U.S. Provisional Patent Application No. 62/727,171 filed Sep. 5, 2018. The disclosure of the above application is incorporated herein by reference.

FIELD OF THE INVENTION

The present invention relates to alignment of hinges on a vehicle lift gate.

BACKGROUND OF THE INVENTION

Assembly of vehicles in a manner which produces the highest consistency in tolerances between outer body parts fit and finish in the outside appearance of the final vehicle is increasingly important.

SUV vehicles provide some challenges in this area due to the common use of rear lift gates which are large and cumbersome and require fitting and adjustments to provide the proper fit and finish. It has been found that the desired consistent gap between the lift gate door and vehicle is hard to maintain properly in the manufacture of SUV vehicles because of slight variations in the hinge and hinge mounting structures creating fit and finish issues elsewhere on the door. This is illustrated in FIG. 3 where the misalignment between the vehicle 16p and the lift gate 14p using a conventional rivet nut fastener F results in the misalignment in area T.

Current practice of mounting a hinge to a lift gate consists of a fixed attachment face, be it compression limiter or rivet nut, for example, installed on the lift gate followed by bolt attachment of the hinge to the fixed attachment face. Many inconsistencies in this normal attachment can occur which result in excess time with custom fitting and adjustments of the lift gate.

Some of the known problems include: potential mounting face variation; compression limiters may not be fully seated; structural brackets might be out of location or inner panel distortion. All of these variations may cause assembly difficulties.

Therefore, it is a goal in the art to provide a simpler, more accurate and cost effective way of mounting hinges and a lift gate to a vehicle.

SUMMARY OF THE INVENTION

In its broad aspects the present invention includes the steps of:
  Step—1: Hinge is loaded onto fore aft slide detail utilizing the body bolt studs as 4-way and 2-way locating features. Stud location duplicates pierced holes punched in the vehicle body for hinge mounting.
  Step—2: Lift gate assembly is held in holding fixture using datums in a fashion optimizing gap and flush expectations when assembled to the vehicle.
  Step—3: Fore aft slide detail is repositioned to put hinge in nominal position with respect to lift gate assembly datum features fixture set.
  Step—4: Hinge mounting bolts are driven into the adjustable element of the lift gate fastener to secure hinge.

In accordance with the present invention there is provided a method of attaching a lift gate door to a vehicle while maintain proper tolerances is provided. A first fixture holds a set of hinges in predetermined locations which correspond to assembly locations on a vehicle body. Hinges are temporarily attached to the fixture corresponding to the proper vehicle location;

A second fixture holds the lift gate in a position which is a final installation position for attaching the lift gate to a vehicle. Self-adjusting moveable fastening nuts are provided in a set of holes in a hinge plate fastening area of the lift gate. The first fixture is moved into aligned orientation with the second feature and the hinges are attached to the lift gate with the fastener. The hinge is aligned in the proper installation orientation for maintaining the lift gate to vehicle gap in proper tolerances when the lift gate door with hinges is installed on the final vehicle.

Using this process, the hinge(s) are positioned to a set point matching a nominal vehicle body mounting location, while the lift gate is held in a fixture in such a way that gap/flushness of the assembly is controlled. During the driving of the bolt to attach the hinge the lift gate attachment face compensates for mounting dimensional variation by adjusting to meet the fixed hinge. The result is an improved gap/flushness between the lift gate assembly and the vehicle. Attaching the hinge to the fixed lift gate attachment face(s) drives variation to the gap/flushness measurements to vehicle body.

Therefore is it an object of the present invention to compensate for hinge mounting dimensional variation by utilizing tolerance compensating fastener in conjunction with part nesting to improve gap condition. The advantages of the invention are in its simplicity and lower costs.

Thus a lift gate for a vehicle is provided which includes a lift gate frame including an inner panel. A hinge is positioned on the lift gate frame which is prepositioned for installation on a vehicle. A tolerance compensating fastener system is interposed between the lift gate frame and the hinge for providing a predetermined position of the hinges matching a predetermined position on a vehicle opening for providing a final installation on the vehicle which matches predetermined tolerances.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
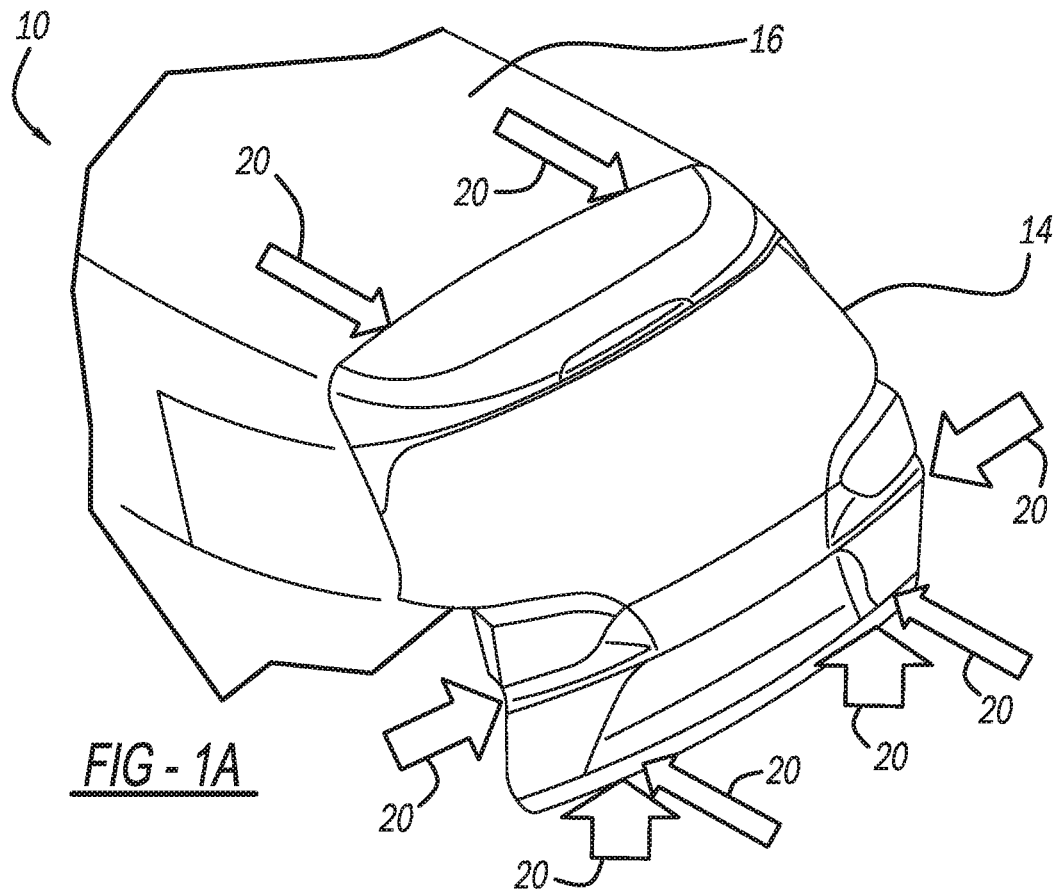
FIG. 1A-1E illustrate the flow diagram of the process in accordance with the teachings of the present invention.
Figure 1B:
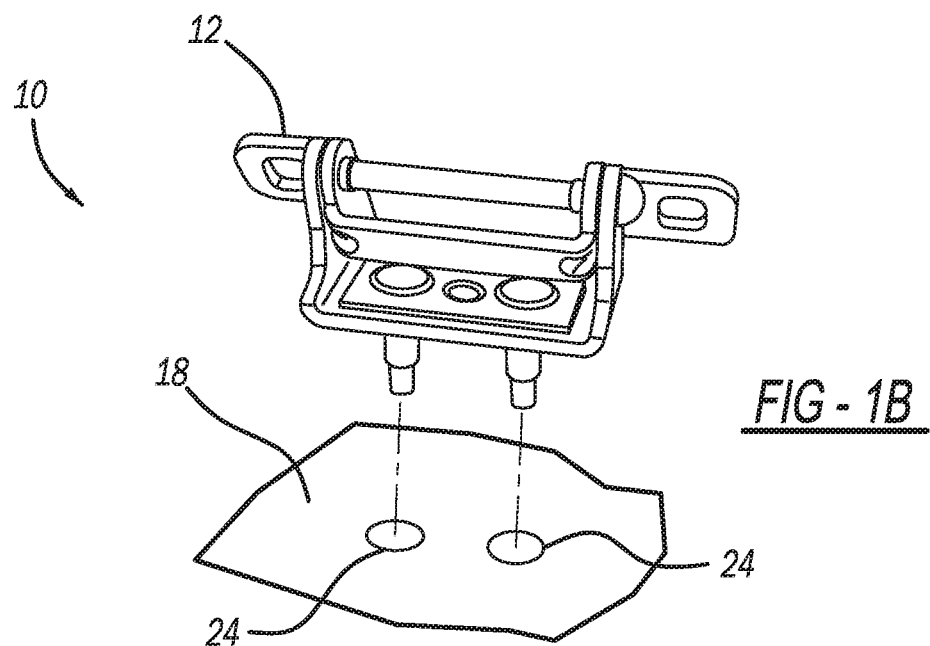
Figure 1C:
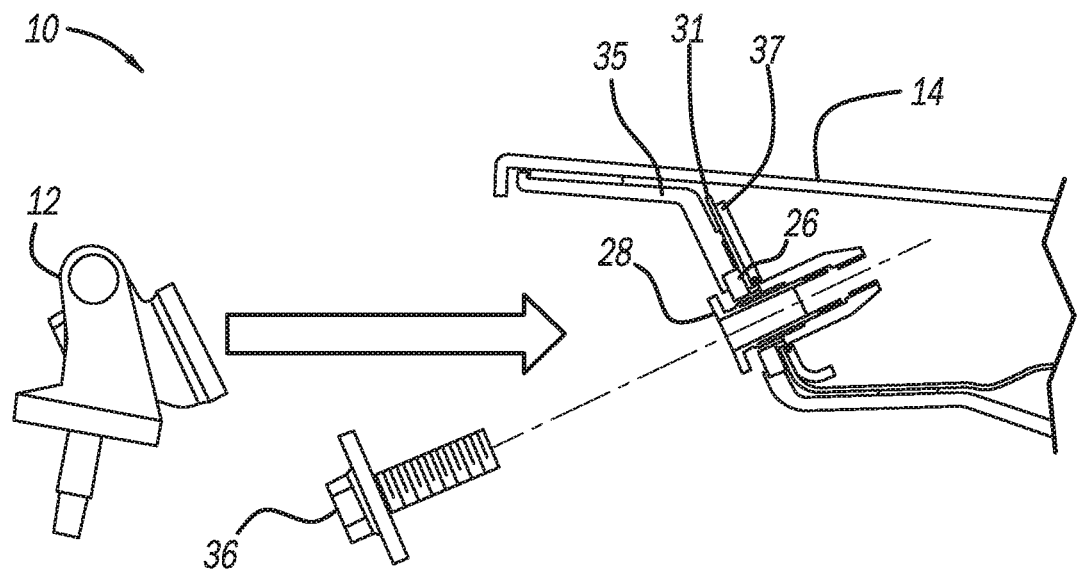
Figure 1D:
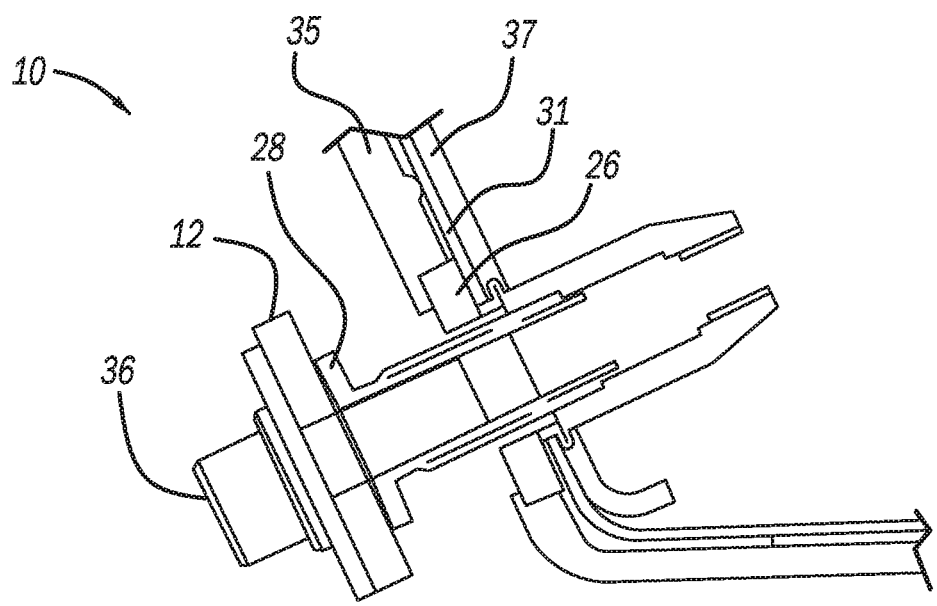
Figure 1E:
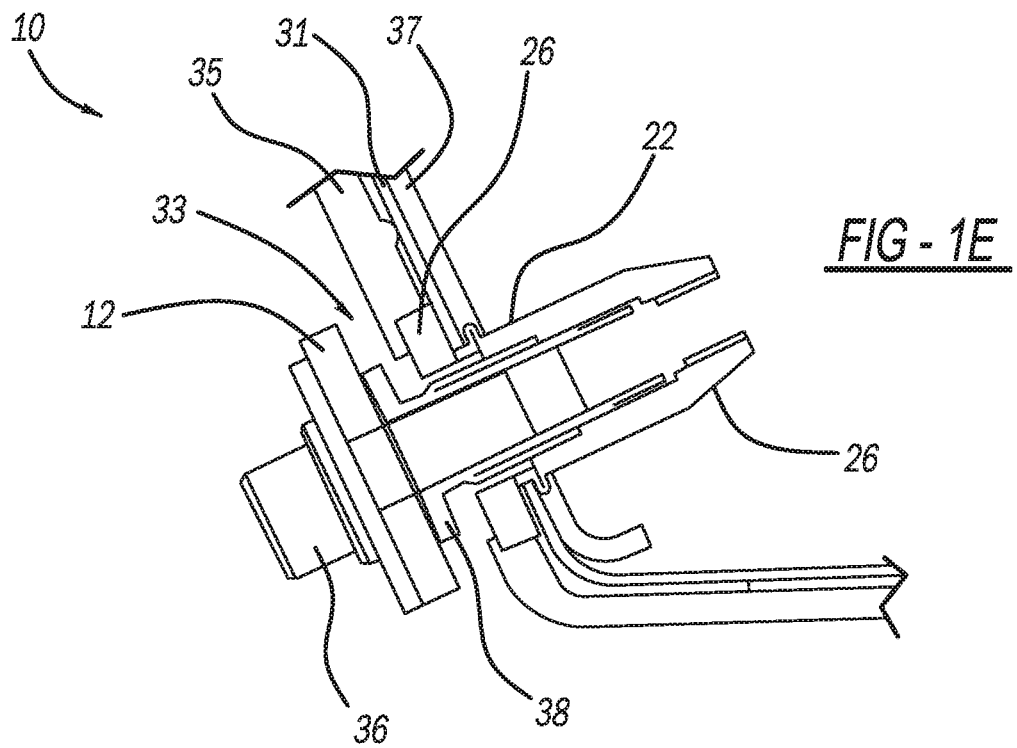
Figure 2A:
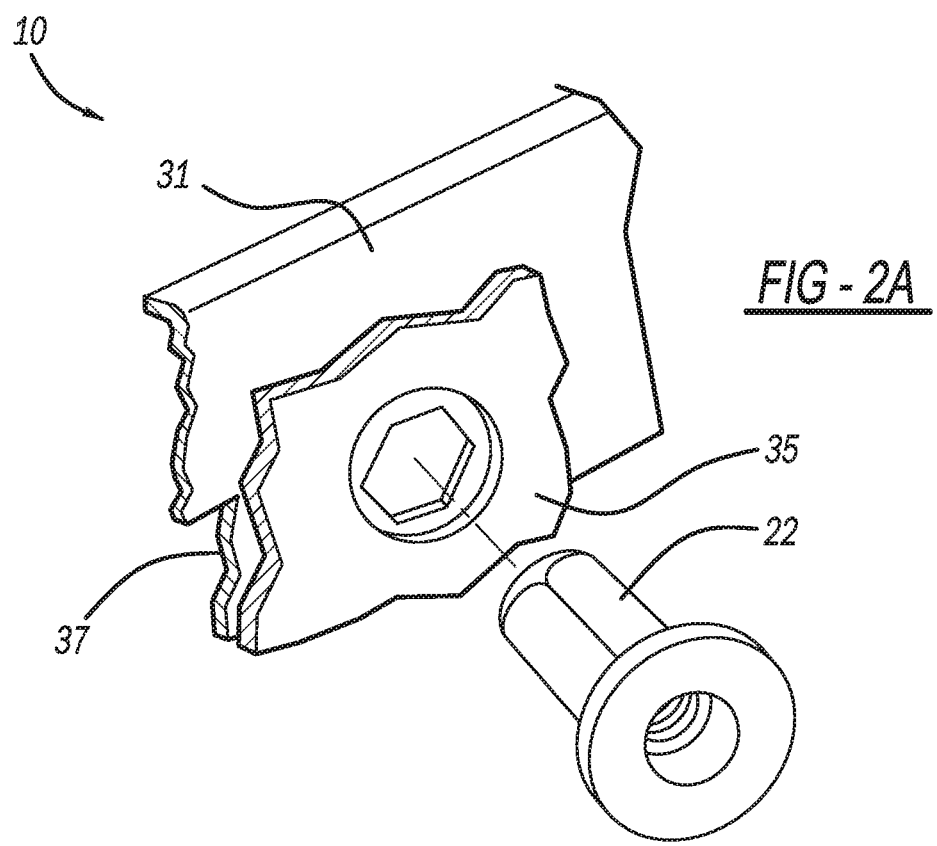
FIG. 2A-2D is a detailed perspective view partially broken away to show the fastening system used in accordance with the teachings of the present invention.
Figure 2B:
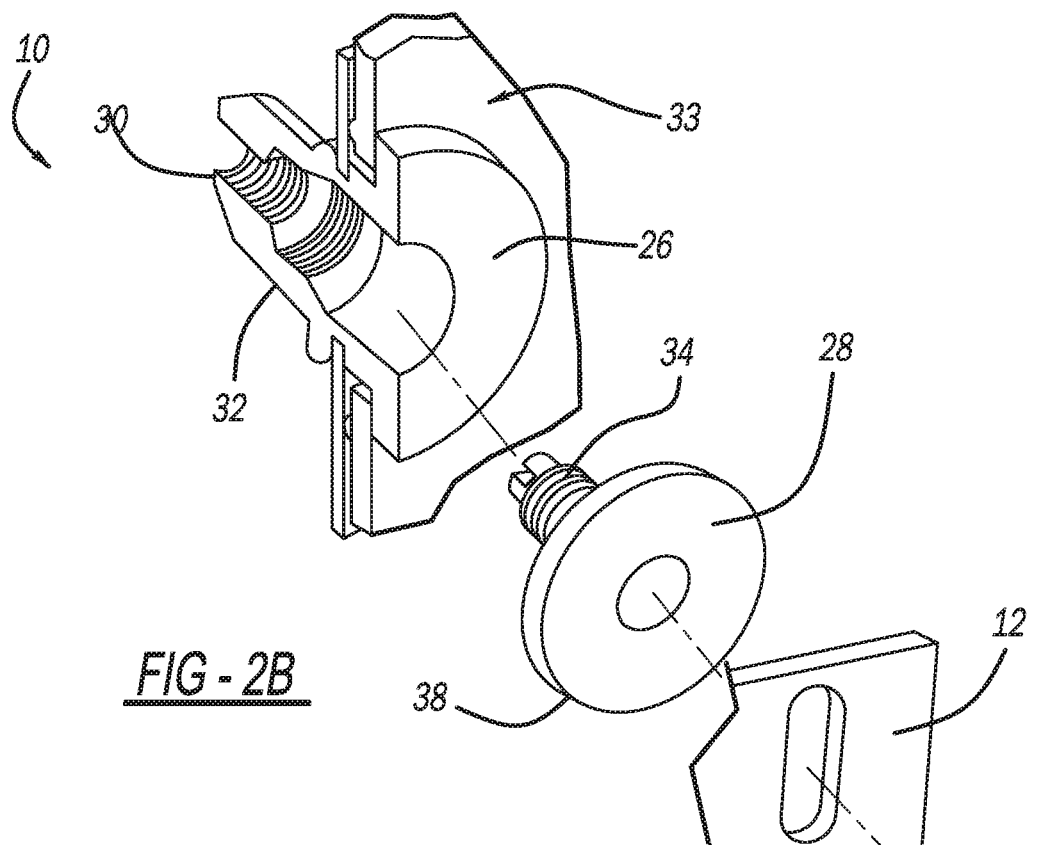
Figure 2C:
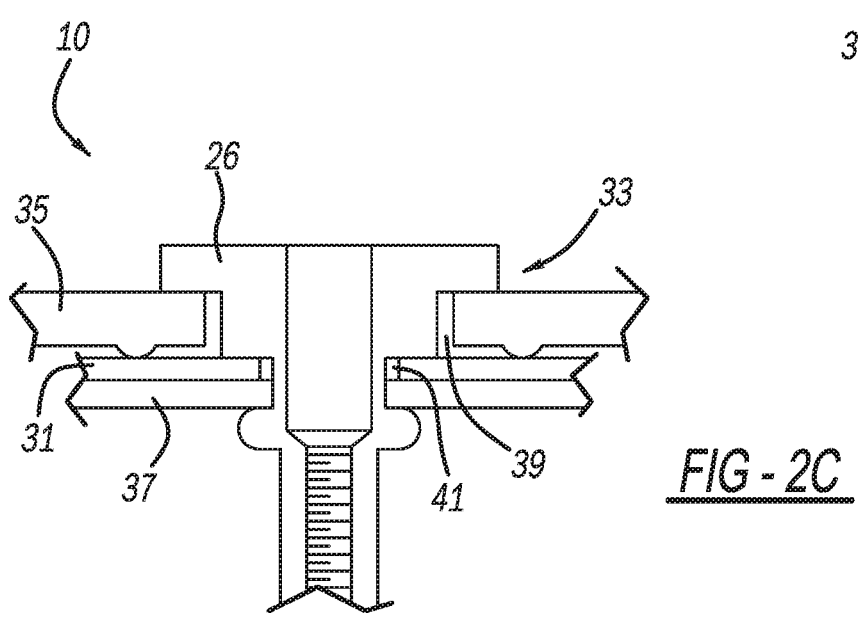
Figure 2D:
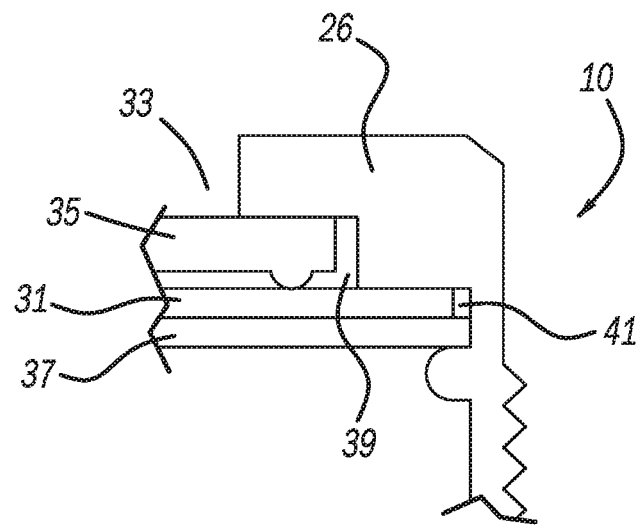
Figure 3:
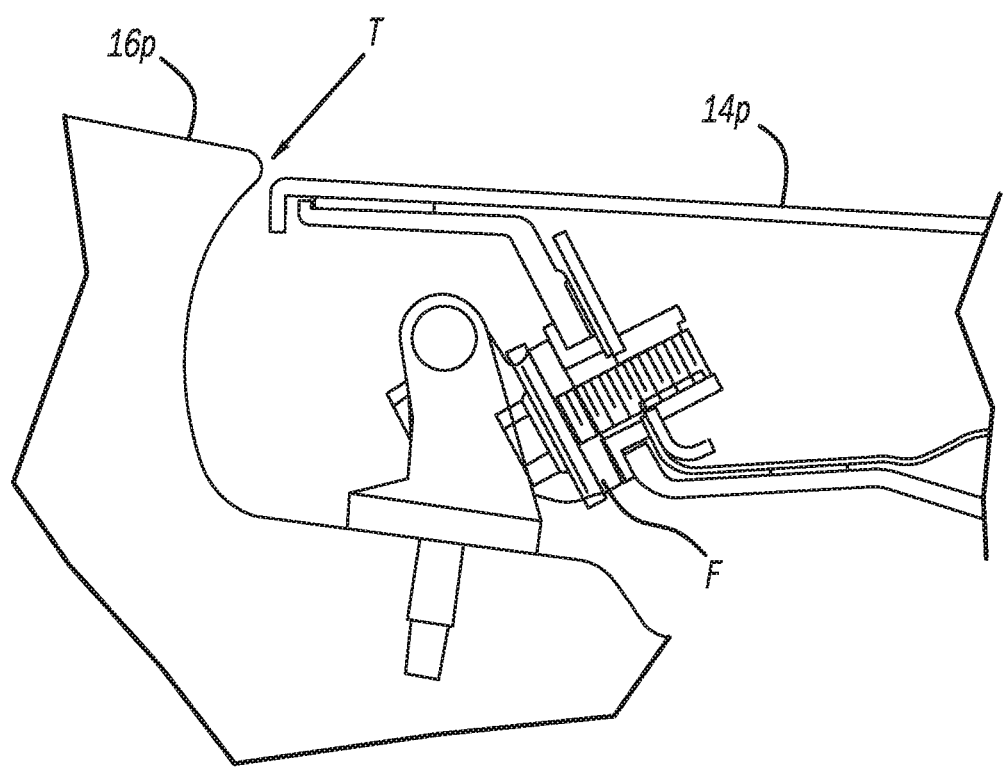
FIG. 3 is an illustration of a standard rivet nut attachment of a lift gate showing the final tolerance issue at area T wherein the lift gate 14p is misaligned with the vehicle show surface 16p.

Referring now to the drawings and specifically FIGS. 1A-1E and 2A-2D there is provided a method generally shown at 10 of attaching hinges 12 to a lift gate door 14, which allows for installing the lift gate door 14 to a vehicle body 16 while maintaining proper tolerances in the final install. A first fixture 18 holds a set of hinges 12 in predetermined locations which correspond to assembly locations on a vehicle body 16. Hinges 12 are temporarily attached to the first fixture 18 corresponding to the proper vehicle body 16 location.

A second fixture 20 holds the lift gate door 14 in a position which is a final installation position for attaching the lift gate door 14 to a vehicle body 16. Self-adjusting moveable fastening nuts, preferably tolerance compensating fasteners 22 are provided in a set of holes in a hinge plate bracket 31 in the fastening area 33 of the lift gate door 14. The lift gate door illustrated includes an inner panel 35 which is typically a polymer panel such as a polypropylene filled panel and a metal frame member 37. The hinge plate bracket is reinforcement member typically steel for providing support of the forces of the hinges. The openings for fasteners in the hinge reinforcement 31 and the inner panel 35 and the first fixture 18 are moved into aligned orientation with the second feature 20 and the hinges 12 are attached to the lift gate door 14 with the fastener 22. The gaps 39 and 41 facilitate the adjustable alignment of the hinges into the proper position on the lift gate 14. The hinge 12 is aligned in the proper installation orientation in both an axial and longitudinal direction for maintaining the lift gate door 14 to vehicle body 16 gap in proper tolerances when the lift gate door 14 with hinges 12 is installed on the final vehicle.

In the first step the first fixture 18 is provided for holding a set of hinges 12 in predetermined locations which corresponds to assembly locations on a vehicle body 16. This is accomplished by taking a computer machine scan of the vehicle opening of the desired vehicle including in particular the detailed x, y and z coordinates of the hinge locations, fastener hole locations 24 and the surfaces on the vehicle body 16 which are associated with the edges of the lift gate door 14. Then an actual fixture is produced which provides a mockup of the exact locations of the hinge attachment. Using this fixture the hinges 12 are temporarily attached to the fixture in an exact location mimicking the proper final installation vehicle location.

A second fixture 20 is made utilizing the scan information of the opening on the vehicle for holding of the lift gate 14 in a position which is a final installation position for attaching the lift gate 14 to a vehicle body 16. This final holding position is set to provide the exact tolerances for the lift gate door 14 to vehicle opening gaps. A suitable computer measuring machine is used to scan the opening for determining the proper fixture orientation.

A predetermined set of holes 24 is provided in a hinge plate fastening area of the lift gate door 14. Providing moveable fastener systems as shown in more detail in FIG. 2A-2D are provided in each of the holes. The moveable fastener system is preferably of the type such as a tolerance compensating fastener. Such a fastener system is available from Bollhoff Inc., Troy, Mich. and marketed under the registered trademark Flexitol. Such fasteners include a fixed element 26 and an adjusting element 28. The fixed element 26 is secured in each hole in the hinge mounting portion by way of a riveting structure or the like. The fixed element 26 includes a first set of threads 30 and a second set of threads 32 which are oppositely threaded. In FIG. 2, the first threads 30 are left hand and the second threads 32 are right hand threaded. The adjusting element 28 includes a left hand threaded portion 34 which is compatible for threading into threads 32 in the fixed element 26. The threads 30 are compatible with the bolt 36 used to secure the hinges 12 in place. The adjustable element 28 includes a head portion 38 which acts to support the hinge 12 in its final attached position.

In operation the adjusting element 28 is threaded flush with the fixed element 26 in each of the holes at each hinge location. Thereafter, using the dimensional calculations the first fixture 18 with the hinge 12 attached is brought into final installed alignment with the first fixture 18 holding the lift gate 14. The bolt 36 is inserted into each mounting hole with the hinge 12 interposed there between and tightened. As the bolt 36 is tightened the adjustable element 28 moves into position behind the hinge 12 for fixing the location of the hinge 12 in the proper position. Thereafter the bolt 36 snugs itself to the other side of the hinge 12 for locking the hinge 12 in place between the head portion 38 of the adjustable element 28 (now in a fixed tolerance adjusted orientation) and the bolt 36 in the correct final axial orientation. This provides for exacting hinge 12 alignment in the proper installation orientation for maintaining the lift gate door 14 to vehicle gap in proper tolerances when the lift gate door 14 with hinges 12 is installed on a vehicle body 16. Thereafter, the lift gate hinges 12 are properly configured when the lift gate door 14 is installed on the actual vehicle body 16. A proper gap between the lift gate door 14 and vehicle body 16 is thereby provided. Thus, any gapping between the hinge mounting face 38 and the interfacing lift gate fastener 22, due to dimensional variation, is compensated for by the adjustable element 28 of the fastener 22 adjusting until the two faces make contact and torque applied. Having the fastener adjustable element 28 compensate prevents the variation showing up as gapping variation to the vehicle body 16.

In a preferred embodiment the position of the hinge 12 on the lift gate door 14 has a form fitting indentation for nesting of the hinge 12. Use of tolerance compensating fastener 22 in conjunction with part nesting further enhances proper assembly tolerances.

In one embodiment, the adjustable element 28 is sub gauge and moveable with respect to the opening but securable in a fixed position after alignment of the hinge 12 in the proper position on the lift gate door 14. Thus, the diameter of the threaded shaft portion is smaller than the diameter of a lift gate door 14 mounting hole such that alignment of the fit of the hinge 12 to the lift gate door 14 is facilitated prior to snugging of the securement head 38 of the adjustable element 28 onto the lift gate 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of attaching a lift gate door to a vehicle while maintaining proper tolerances comprising the steps of:
   a. Providing a first fixture for holding a set of hinges in predetermined locations which corresponds to assembly locations on a vehicle body and temporarily attaching the hinges to said fixture in a proper vehicle location;
b. Providing a second fixture for holding of a lift gate door in a position which is a final installation position for attaching said lift gate door to said vehicle;
c. Providing a predetermined set of holes in a hinge plate fastening area of said lift gate door and providing moveable fastening nuts in each of the holes; and,
d. Moving the first fixture in an aligned orientation with the second fixture and attaching said hinges to the lift gate door with a fastener whereby the hinge is aligned in the proper installation orientation for maintaining the lift gate door to vehicle gap in proper tolerances when the lift gate door with hinges is installed on a vehicle.

2. The method of claim 1 further comprising the step of installing said lift gate door on said vehicle.

3. The method of claim 1 wherein the moveable fastening nuts comply with the aligned orientation of the hinge with said lift gate door to provide securement of the hinge with the door in the aligned orientation.

4. The method of claim 1 wherein locating surfaces are provided on said liftgate door at the hinge locations for assisting in alignment of the hinges.

5. The method of claim 1 wherein the moveable nuts further comprises a tolerance compensating fastener system.

6. The method of claim 5 wherein the tolerance compensating fastener system comprises a fixed element and an adjusting element.

7. The method of claim 6 wherein the adjusting element is sub gauge and moveable with respect to the opening but securable in a fixed position after alignment of the hinge in the proper position on the lift gate.

8. The method of claim 7 wherein the fixed element includes a first set of threads in a radial portion in a first direction for engaging the threads of a final bolt fastener and a second set of threads in an opposite direction for engaging corresponding threads of the adjusting element such that the fastener turns the adjusting element in a direction for pulling it axially toward the fixed element until it is tightened to a predetermined torque where after the bolt is drawn further into the fixed member via the first set of threads.

9. The method of claim 8 wherein the adjusting element has a threaded shaft portion and a securement head portion, wherein the diameter of the threaded shaft portion is smaller than the diameter of a mounting hole in said liftgate door such that alignment of the fit of the hinge to the lift gate is facilitated prior to snugging of the securement head onto the body panel.

* * * * *